United States Patent
Al-Taq et al.

(10) Patent No.: US 11,299,663 B2
(45) Date of Patent: Apr. 12, 2022

(54) METHOD FOR MODIFYING WELL INJECTION PROFILE AND ENHANCED OIL RECOVERY

(71) Applicant: SAUDI ARABIAN OIL COMPANY, Dhahran (SA)

(72) Inventors: Ali Abdullah Al-Taq, Dhahran (SA); Zuhair AlYousif, Dhahran (SA); Othman Alswaie, Dammam (SA)

(73) Assignee: SAUDI ARABIAN OIL COMPANY, Dhahran (SA)

(*) Notice: Subject to any disclaimer, the term of this patent is extended or adjusted under 35 U.S.C. 154(b) by 0 days.

(21) Appl. No.: 16/892,784

(22) Filed: Jun. 4, 2020

(65) Prior Publication Data

US 2021/0380869 A1 Dec. 9, 2021

(51) Int. Cl.
*E21B 43/16* (2006.01)
*C09K 8/594* (2006.01)
*E21B 43/24* (2006.01)

(52) U.S. Cl.
CPC ............ *C09K 8/594* (2013.01); *E21B 43/164* (2013.01); *E21B 43/166* (2013.01); *E21B 43/24* (2013.01)

(58) Field of Classification Search
CPC ........ C09K 8/164; E21B 43/166; E21B 43/24
See application file for complete search history.

(56) References Cited

U.S. PATENT DOCUMENTS

| | | | |
|---|---|---|---|
| 3,612,179 A | 10/1971 | Anderson et al. | |
| 3,893,511 A | 7/1975 | Root | |
| 4,232,741 A | 11/1980 | Richardson et al. | |
| 4,737,296 A | 4/1988 | Watkins | |
| 4,846,277 A * | 7/1989 | Khalil | C09K 8/703 166/280.1 |
| 4,923,009 A | 5/1990 | Watkins | |
| 7,148,184 B2 | 12/2006 | Francini et al. | |
| 7,464,754 B1 | 12/2008 | Decker et al. | |
| 9,657,552 B2 * | 5/2017 | Choudhary | E21B 43/24 |
| 2007/0042913 A1 * | 2/2007 | Hutchins | C09K 8/685 507/269 |
| 2012/0152536 A1 | 6/2012 | Winslow et al. | |

(Continued)

FOREIGN PATENT DOCUMENTS

| | | |
|---|---|---|
| CA | 1096768 A | 3/1981 |
| CN | 101323780 A | 12/2008 |

(Continued)

OTHER PUBLICATIONS

International Search Report and Written Opinion issued in Application No. PCT/US2020/041009, dated Feb. 26, 2021 (13 pages).

*Primary Examiner* — Silvana C Runyan
(74) *Attorney, Agent, or Firm* — Osha Bergman Watanabe & Burton LLP

(57) ABSTRACT

A method for treating a hydrocarbon-containing formation includes injecting an aqueous solution that contains an alkali nitrite, an ammonium halide, and a foaming agent into the formation, injecting supercritical carbon dioxide into the formation, allowing a portion of the carbon dioxide to dissolve in the aqueous solutions, causing the alkali nitrite and ammonium halide to react and generate nitrogen gas, and allowing a foam to form by the interaction of the nitrogen gas with the foaming agent.

27 Claims, 3 Drawing Sheets

(56) References Cited

U.S. PATENT DOCUMENTS

| | | |
|---|---|---|
| 2015/0361328 A1 | 12/2015 | Almutairi |
| 2016/0265326 A1* | 9/2016 | Nguyen .................... C09K 8/80 |
| 2017/0073571 A1* | 3/2017 | Salla ....................... C09K 8/032 |

FOREIGN PATENT DOCUMENTS

| | | | |
|---|---|---|---|
| CN | 101671553 | A | 3/2010 |
| CN | 103834376 | A | 6/2014 |
| CN | 108659806 | A | 10/2018 |
| CN | 109281643 | A | 1/2019 |
| CN | 110272726 | A | 9/2019 |
| RU | 2236575 | C2 | 9/2004 |
| RU | 2250364 | C2 | 4/2005 |

* cited by examiner

METHOD FOR MODIFYING WELL INJECTION PROFILE AND ENHANCED OIL RECOVERY

Enhanced oil recovery (EOR) enables the extraction of hydrocarbon reserves that conventional primary and secondary recovery processes cannot access, such as gas or water displacement. Gas injection is one of the most widely used EOR techniques as application of an oil-miscible injection gas can greatly improve oil recovery in gas-swept zones.

To improve oil recovery by gas injection, the injection profile of a well may be modified, particularly where the well contains strata having varying permeabilities. As with water injection, gas injection generally provides decreased oil recovery when applied in variably-permeable wells. In such circumstances, the gas will preferentially sweep the high permeability intervals, leaving the less permeable intervals upswept and consequently not recovering a portion of the reserve.

The use of foams is one of the most promising techniques to overcome the difficulties posed by variable permeability reservoirs and improve the volumetric sweep efficiency. Foam can plug the high permeability intervals by increasing the apparent viscosity, and reducing the relative permeability, of the gas. Generally, foams are generated by mixing the injection gas with a surfactant-containing injection water. The injection of alternate slugs of gas and surfactant (which may also be referred to as a foaming agent) generates foam in the reservoir due to a reduction of interfacial tension at the gas-liquid interface. Alternatively, a foam may be pre-generated at the surface and then injected into the formation. However, this approach is less commonly used as it requires a high injection pressure.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to methods for treating a hydrocarbon-containing formation. The methods of one or more embodiments may include injecting an aqueous solution that contains an alkali nitrite, an ammonium halide, and a foaming agent into a formation, injecting supercritical carbon dioxide into the formation, allowing a portion of the carbon dioxide to dissolve in the aqueous solutions, causing the alkali nitrite and ammonium halide to react and generate nitrogen gas, and allowing a foam to form by the interaction of the nitrogen gas with the foaming agent. In some embodiments, the aqueous solution may include a mixture of a first aqueous solution containing the ammonium halide in a concentration of the range of 0.5 to 13 M and a second aqueous solution containing the alkali nitrite in a concentration of the range of 1 to 15 M. In some embodiments a molar ratio of the ammonium halide to the alkali nitrite that are injected into the formation may be of the range of 1:1 to 1:3. In one or more embodiments the reaction between the alkali nitrite and ammonium halide may be triggered by the pH of the aqueous solutions decreasing to 5 or less and the foam that is foamed may have a viscosity in the range of about 1 to 50 cP.

In a further aspect, embodiments disclosed herein relate to methods for enhanced oil recovery. The methods of one or more embodiments may include injecting a solution comprising an alkali nitrite, an ammonium halide, and a foaming agent into a high permeability zone of a hydrocarbon-containing formation, decreasing a pH of the solution by injecting supercritical carbon dioxide into the formation, reacting the alkali nitrite and the ammonium halide to generate nitrogen gas, forming a foam with the foaming agent in the high permeability zone, and stimulating a flow of hydrocarbons from a low permeability zone.

Other aspects and advantages of the claimed subject matter will be apparent from the following description and the appended claims.

DETAILED DESCRIPTION

Figure 1:
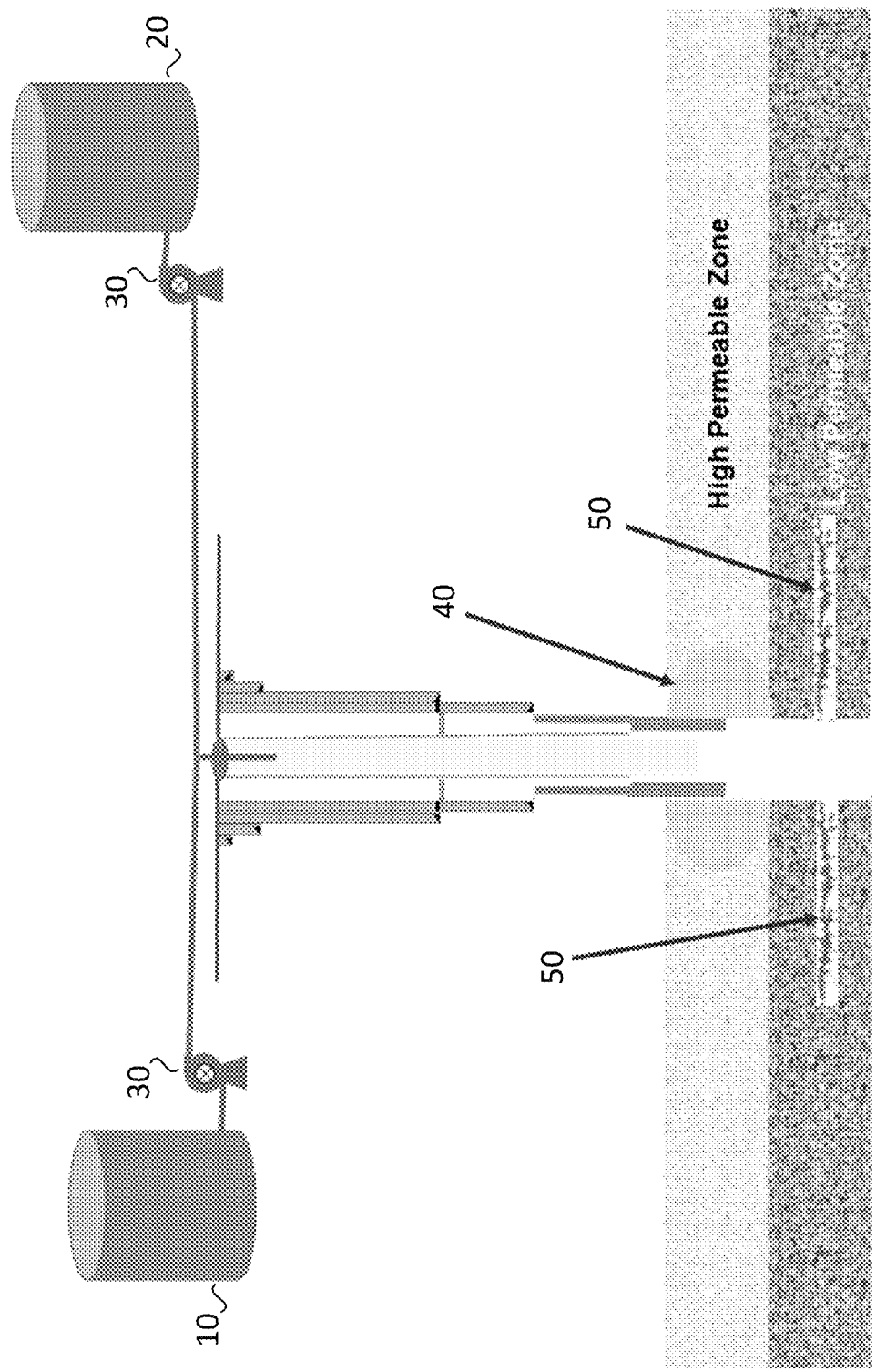
FIG. 1 is a schematic depiction of a method of modifying a well injection profile of one or more embodiments.

Embodiments in accordance with the present disclosure generally relate to methods for generating foams in a hydrocarbon-containing subterranean formation. Such methods may be directed to EOR processes, and the generation of a foam may modify the injection profile of the formation.

The methods of one or more embodiments may employ a first fluid that contains a first salt and a second fluid that contains a second salt. One or more of the first and second fluids may contain a foaming agent. After the fluids are injected into a formation, they may mix. Supercritical carbon dioxide may be co-injected with the fluids. In the formation, through either an increase in temperature or a decrease in pH, an exothermic nitrogen-generating reaction may be triggered. The generated nitrogen gas forms a foam upon contact with the foaming agent. The generated foam has high apparent viscosity that may plug the high permeable intervals and divert the injected gas to lower permeability zones, increasing the sweep efficiency of the gas.

The first and second salts of one or more embodiments may be any suitable compounds that react to produce nitrogen gas under the conditions of the formation. In particular embodiments, the first salt may be an ammonium salt and the second reactant may be a nitrite salt. The salts may react in a nitrogen-generating reaction, such as represented below by equation (I), to produce heat and nitrogen gas. In equation (I), X represents a monovalent anion and A a monovalent cation. In some embodiments, divalent and trivalent ions may alternatively be utilized, with appropriate modification of the stoichiometry of equation (I).

$$NH_4X + ANO_2 \rightarrow N_2 + H_2O + AX \qquad (I)$$

In one or more embodiments, the first salt may be any that contains an ammonium ($NH_4^+$) ion. For instance, the first salt may be an ammonium halide, ammonium hydroxide, ammonium nitrate, ammonium nitrite, ammonium sulfate, and ammonium carbonate. In some embodiments, the first salt may be an ammonium halide and may be selected from the group consisting of ammonium fluoride, ammonium chloride, ammonium bromide, and ammonium iodide.

In one or more embodiments, the second salt may be any that contains a nitrite ($NO_2^-$) ion. For instance, the second salt may be an alkali metal nitrite, an alkali earth metal nitrite, or a transition metal nitrite. In some embodiments, the second salt may be an alkali metal nitrite and may be selected from the group consisting of sodium nitrite and potassium nitrite.

In particular embodiments, the first salt may be ammonium chloride and the second salt may be sodium nitrite. In such embodiments, the reaction according to equation (I) is highly exothermic ($\Delta H=-79.95$ kcal mol$^{-1}$).

In one or more embodiments, one or more of the first and second salts may be encapsulated. In some embodiments, the encapsulation materials can include hydrated polymers, such as guar, chitosan, and polyvinyl alcohol. In particular embodiments, such hydrated polymers may be used to encapsulate the second salt. In some embodiments, binders, such as carboxymethyl cellulose or xanthan can be used as an encapsulant. In particular embodiments, the carboxymethyl cellulose or xanthan may be encapsulants for the first salt. The heat of formation, the pH, the temperature, or the aqueous fluid composition can all play a role in the erosion or removal of the encapsulating material, thereby effecting the rate of release of the reactants.

As discussed above, methods in accordance with the present disclosure may comprise the injection of two fluids into a formation, a first fluid that comprises the first salt and a second fluid that comprises the second salt. In one or more embodiments, the first and second fluids are both aqueous fluids that comprise the first and second salts, respectively, dissolved in aqueous solution. The first and second fluids may be coinjected into a formation, wherein they mix.

In one or more embodiments, the aqueous fluids may include at least one of fresh water, seawater, brine, water-soluble organic compounds, and mixtures thereof. The aqueous fluids may contain fresh water formulated to contain various salts in addition to the first or second salt, to the extent that such salts do not impede the desired nitrogen-generating reaction. The salts may include, but are not limited to, alkali metal halides and hydroxides. In one or more embodiments, brine may be any of seawater, aqueous solutions wherein the salt concentration is less than that of seawater, or aqueous solutions wherein the salt concentration is greater than that of seawater. Salts that are found in seawater may include sodium, calcium, aluminum, magnesium, potassium, strontium, and lithium salts of halides, carbonates, chlorates, bromates, nitrates, oxides, phosphates, among others. Any of the aforementioned salts may be included in brine. The salts of one or more embodiment are compatible with other wellbore fluids and will not result in the formation of precipitates. For example, fluids herein may include an alkali metal hydroxide, seawater, and strontium halides, but may be compatible with formation brine and not result in precipitate formation. In one or more embodiments, the density of the first and second aqueous fluids may be controlled by increasing the salt concentration in the brine, though the maximum concentration is determined by the solubility of the salt. In particular embodiments, brine may include an alkali metal halide or carboxylate salt and/or alkaline earth metal carboxylate salts.

In one or more embodiments, the first and second fluid may contain the first and second salts, respectfully, in a suitable concentration to provide a nitrogen-generating react ion having the desired kinetics for a given application. One of ordinary skill will appreciate, with the benefit of this disclosure, that the concentration of a given salt is limited by the solubility of the salt in the fluid under the conditions of the process. In addition, the concentrations of the first and second salts may affect the quality and properties of a generated foam, as well as the injection capability of the first and second fluids.

In one or more embodiments, the first fluid may comprise the first salt in a concentration of the range of about 0.5 to 13 M. For example, the first fluid may contain the first salt in a concentration of a range from a lower limit of any of 0.5, 1, 2, 4, 6, and 8 M to an upper limit of any of 1, 3, 5, 7, 9, and 13 M, where any lower limit can be used in combination with any mathematically-compatible upper limit.

In one or more embodiments, the second fluid may comprise the second salt in a concentration of the range of about 1 to 15 M. For example, the second fluid may contain the second salt in a concentration of a range from a lower limit of any of 1, 3, 5, 7, 9, 11, and 13 M to an upper limit of any of 2, 4, 6, 8, 10, 12, and 15 M, where any lower limit can be used in combination with any mathematically-compatible upper limit. In particular embodiments, the second fluid may comprise the second salt in a greater concentration than that of the first salt in the first fluid.

Methods in accordance with one or more embodiments of the present disclosure may include a molar excess of one of the first and second salts, relative to the other. In particular embodiments, there may be a molar excess of the second salt over the first salt. For example, the mole ratio of first salt to second salt used in the methods of the present disclosure may be of the range of 1:1 to 1:3. In some embodiments, the first and second salts may be used in amounts such that the mole ratio of the first salt to the second salt ranges from a lower limit of any of 1:1, 1:1.1, 1:1.2, 1:1.3, 1:1.5, 1:1.8, and 1:2 to an upper limit of any of 1:1.7, 1:2, 1:2.2, 1:2.5, 1:3, where any lower limit can be used in combination with any mathematically-compatible upper limit. One of ordinary skill in the art will appreciate, with the benefit of this disclosure, that the desired excess of the second salt can be provided by one or more of the relative volume and concentrations of the first and second fluids.

One or more of the first and second fluids further comprise one or more foaming agents. The foaming agent of one or more embodiments may be any suitable foaming agent known in the art. One of ordinary skill will appreciate, with the benefit of this disclosure, that the foaming agent may be selected by the desired properties of the generated foam. In particular embodiments, the selected foaming agent will be stable under the conditions of the method, including, for instance, the pH, temperature, brine salinity, and pressure, that the fluids are exposed to. The foaming agent of one or more embodiments may be selected to be minimally absorbed by the rock of a formation. A non-limiting example of a foaming agent of one or more embodiments is AMPHOSOL® LB (Stepan Company of Northfield, Ill.).

In one or more embodiments, the first or second fluid may comprise the foaming agent in an amount of the range of about 0.1 to 10% by weight (wt. %). For example, the first or second fluid may contain the foaming agent in an amount ranging from a lower limit of any of 0.1, 0.3, 0.5, 0.7, 1.0, 2.0, and 3.0 wt. % to an upper limit of any of 0.5, 1.0, 1.5, 2.0, 2.5, 5.0, and 10 wt. %, where any lower limit can be used in combination with any mathematically-compatible upper limit.

In one or more embodiments, the first and second fluids have a density that is greater than 1.00 g/cm$^3$. For example, the first and second fluids may have a density that is of an amount ranging from a lower limit of any of 1.00, 1.10, 1.20, 1.30, and 1.40 g/cm$^3$ to an upper limit of any of 1.40, 1.50, 1.60, 1.70, 1.80, and 2.00 g/cm$^3$, where any lower limit can be used in combination with any mathematically-compatible upper limit. The first and second fluids of one or more embodiments may have the same density. In some embodiments, the first and second fluids may have different densities.

After injection and mixing of the first and second fluids in a formation, a triggering event is generally necessary to initiate the aforementioned nitrogen-generating reaction. In some embodiments, the triggering event may be one or more of a decrease in pH and an increase in temperature. One of ordinary skill in art will appreciate, with the benefit of this disclosure, that the nature of a triggering event necessary to initiate a reaction is highly dependent upon the specific first and second salts, and their relative concentrations, being used. Additionally, the nature of the triggering event may also be determinative of the foaming agent selected for use in one or more embodiments. Specifically, if the triggering event is a decrease of pH to 4 or less, the foaming agent needs to be, and generate a foam that is, stable at that pH.

In one or more embodiments, a nitrogen-generating reaction may be triggered by a decrease in pH. For example, the nitrogen-generating reaction may be triggered at a pH of 6 or less, 5.5 or less, 5 or less, 4.5 or less, or 4 or less. In some embodiments, the nitrogen-generating reaction may be triggered at a pH of a value ranging from a lower limit of any of 1, 2, 3, 3.5, 4.0, and 4.5 to an upper limit of any of 4.0, 4.5, 5.0, 5.5, and 6.0, where any lower limit can be used in combination with any mathematically-compatible upper limit.

In one or more embodiments, the pH of the solution may be decreased by the addition of an acid. In some embodiments, the pH may decrease as a result of the aqueous dissolution of carbon dioxide, generating carbonic acid. In some embodiments, the pH may decrease as a result of the dissolution of a sour gas, such as hydrogen sulfide.

In one or more embodiments, a nitrogen-generating reaction may be triggered by an increase in temperature. For example, the nitrogen-generating reaction may be triggered at a temperature of 50° C. or more, 60° C. or more, 70° C. or more, 80° C. or more, 90° C. or more, or 100 C or more. In some embodiments, the nitrogen-generating reaction may be triggered at a temperature ranging from a lower limit of any of 50, 55, 60, 65, 70, 75, 80, and 90° C. to an upper limit of any of 60, 65, 70, 75, 80, 90, and 100° C., where any lower limit can be used in combination with any mathematically-compatible upper limit.

In one or more embodiments, the temperature of the solution may be increased by the exothermic dissolution of a solute. In some embodiments, the temperature may increase as a result of the aqueous dissolution of carbon dioxide, generating worm-holes. In some embodiments, the formation in which the fluids are injected is warm enough at specific depths to trigger the nitrogen-generating reaction. In some embodiments, the temperature may increase as a result of the aqueous dissolution of hydrogen sulfide, generating worm-holes, such as in carbonate-bearing formations.

In addition to the injection of the first and second fluids, methods in accordance with one or more embodiments further comprise the injection of supercritical carbon dioxide. The supercritical carbon dioxide will, in some embodiments, be co-injected with the first and second fluids. In some embodiments, the carbon dioxide may be injected after the first and second fluids. In the formation, the dissolution of the carbon dioxide in the solutions may result in a pH decrease or temperature increase, as discussed above, triggering the nitrogen-generating reaction.

In one or more embodiments, the supercritical $CO_2$ may be co-injected at a quality in the range of 10 to 95%. As used herein, the term "quality" is used herein to describe the volumetric flow of the discontinuous phase (such as a gas or supercritical fluid) of a foam relative to the total volumetric flow in the co-injection process. In some embodiments, the quality of the supercritical carbon dioxide may be of a range having a lower limit of any of 10, 15, 20, 25, 30, 40, and 50% to an upper limit of any of 40, 50, 60, 70, 80, and 95%, where any lower limit can be used in combination with any mathematically-compatible upper limit. In one or more embodiments, the quality of carbon dioxide may be dependent upon the foaming agent used.

In one or more embodiments, the nitrogen foam may be more viscous than water and nitrogen. The nitrogen foam may also be more viscous than the injected fluids and, therefore, be suitable for plugging the more permeable zones of the formation. The generated nitrogen foam of one or more embodiments may have an apparent viscosity ranging from about 1 to 50 cP. In some embodiments, the apparent viscosity of the nitrogen foam may be of a range having a lower limit of any of 1, 2, 3, 5, 7, 10, 15, and 20 cP to an upper limit of any of 6, 8, 10, 12, 20, 30, 40, and 50 cP, where any lower limit can be used in combination with any mathematically-compatible upper limit. In one or more embodiments, the nitrogen foam may exhibit shear thinning, where its viscosity values decrease with increasing shear rate. One of ordinary skill in the art will appreciate, with the benefit of this disclosure, that many parameters may impact the rheological properties of a foam, such as temperature, pressure, brine salinity, foaming agent type, concentration, and foam quality.

The generated nitrogen foam of one or more embodiments may have a quality ranging from about 50 to 99%. As used herein, the "quality" of a foam describes the volume of the gas contained by the foam relative to the total volume of the foam. In some embodiments, the quality of the nitrogen foam may be of a range having a lower limit of any of 50, 60, 70, 80, 90, and 95% to an upper limit of any of 55, 65, 75, 85, 95, and 99%, where any lower limit can be used in combination with any mathematically-compatible upper limit. In one or more embodiments, the quality of the nitrogen foam may be dependent upon the foaming agent used.

The methods of one or more embodiments of the present disclosure may further comprise a pre-flushing step before the injection of the first and second aqueous fluids. The pre-flushing step may comprise flushing the formation with a flushing solution that comprises a foaming agent. The flushing solution may be an aqueous solution, and the foaming agent may be the same foaming agent as included in the first and/or second fluids. The pre-flushing may limit the adsorption of the foaming agent on the rock surface of the formation during the injection process. In some embodiments, the pre-flushing may provide a stronger foam. The suitability of the use of a pre-flushing step may depend on the type of foaming agent and rock.

The hydrocarbon-containing formation of one or more embodiments may be a formation containing multiple zones of varying permeability. For instance, the formation may contain at least a zone having a relatively higher permeability and a zone having a relatively lower permeability. During conventional injection, fluids and gases preferentially sweep the higher permeability zone, leaving the lower permeability zone incompletely swept. In one or more embodiments, the generated nitrogen foam may plug the higher permeability zone, allowing subsequent fluid to sweep the low permeability zone and improving sweep efficiency.

The methods of one or more embodiments may be used for EOR operations (see FIG. 1). In some embodiments, the first and second fluids 10 may be co-injected into a hydrocarbon-bearing formation at an injection well with supercritical carbon dioxide 20. The co-injection may be performed by using pumps 30. After a nitrogen foam is generated within the formation (as detailed above), fluid may be driven through the mobile zone of the formation, displacing hydrocarbons and increasing the hydrocarbon-saturation of the oil bank. As the nitrogen foam may plug the more permeable zones of the formation 40, wormholes 50 into the lower permeability zone may be produced by the dissolved carbonic acid and the fluid may preferentially displace hydrocarbons from lower permeability zones. In one or more embodiments the hydrocarbons may be recovered at a production well.

In one or more embodiments, the EOR process may be repeated one or more times to increase the amount of hydrocarbons recovered. In some embodiments, subsequent EOR processes may involve the use of different amounts of the first and second salts and/or different foaming agents than the first. The methods of one or more embodiments may advantageously provide improved sweep efficiency. They also do not require the use of gas injection or facilities therefor.

EXAMPLES

The following examples are merely illustrative and should not be interpreted as limiting the scope of the present disclosure.

Figure 2:
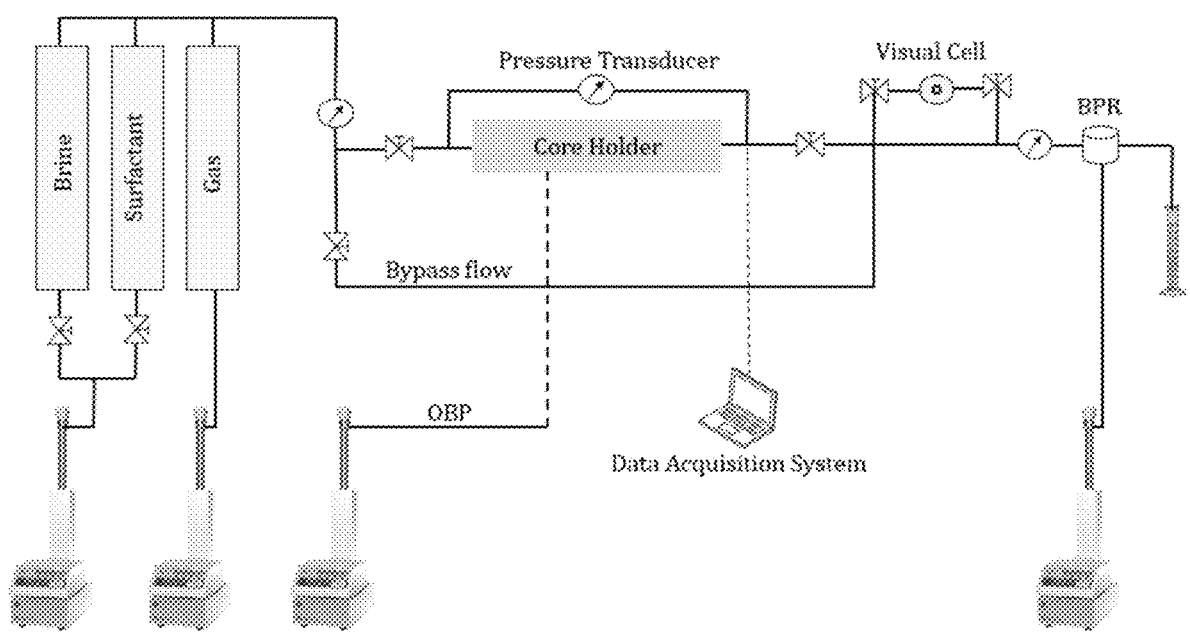
FIG. 2 is a schematic depiction of a coreflood apparatus for performing a dynamic foam experiment.

A dynamic foam experiment in porous media was conducted using a coreflood apparatus, as depicted by FIG. 2. Carbonate rock samples were placed in an oven overnight to ensure that they were dry before use. Each sample was further placed in a core holder and a vacuum was applied to remove any gases trapped inside the pores of the rock. Subsequently, a minimum of ten pore volumes (PVs) of seawater was injected at 5 ft/day to 100% saturate the rock with brine. The samples were pre-flushed with a foaming agent solution at 5 ft/day for 1 PV at a pressure of 3200 psi and a temperature of 100° C. Finally, co-injection of supercritical carbon dioxide and liquid solutions containing a surfactant, sodium nitrite, and ammonium chloride, was conducted at 30% quality and the pressure drop across the rock sample was recorded for each test. The surfactant used in these experiments was AMPHOSOL® LB in a concentration of 1 wt %, and the ammonium chloride and sodium nitrite were used at concentrations having a ratio of 1:2 (ammonium chloride/sodium nitrite).

Figure 3:
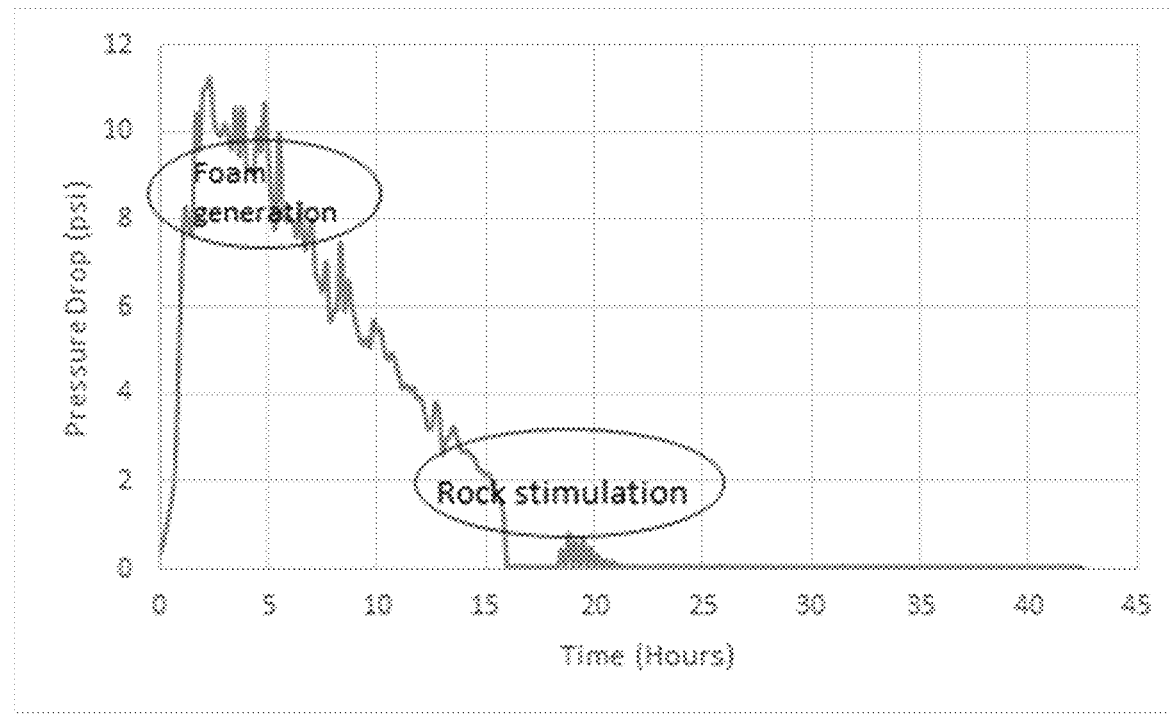
FIG. 3 is a graphical representation of the results of a simulation of core plugging by a $CO_2$/water system.

The objective of the tests was to evaluate the foam strength generated by the reaction of ammonium chloride and sodium nitrite in the presence of a foaming agent. The experiment also assessed the ability of carbonated water to stimulate a rock sample. The pressure drop ($\Delta P$) across rock samples were measured to evaluate the foam strength and rock stimulation. Higher pressure drops across rock samples indicate more resistance to gas flow and, hence, foams with higher viscosity. Also, the drop in pressure after foam generation represents a change in the rock permeability as the foam generation is continuous. As is seen in FIG. 3, a large pressure drop was observed after foam generation.

Equation (II) depicts the reaction of the two salts, sodium nitrite and ammonium chloride, and the products of this reaction. As shown, nitrogen gas ($N_2$) is produced, which can be used for in-situ generation of foam.

$$NH_4Cl + NaNO_2 \rightarrow N_2 + H_2O + NaCl \qquad (II)$$

This reaction was performed in the laboratory at a pH value of 4, as provided by the dissolution of $CO_2$. Ammonium chloride was used at a concentration of 3 M and sodium nitrite was used at a concentration of 5 M. Nitrogen gas was generated and detected.

Figure 4:
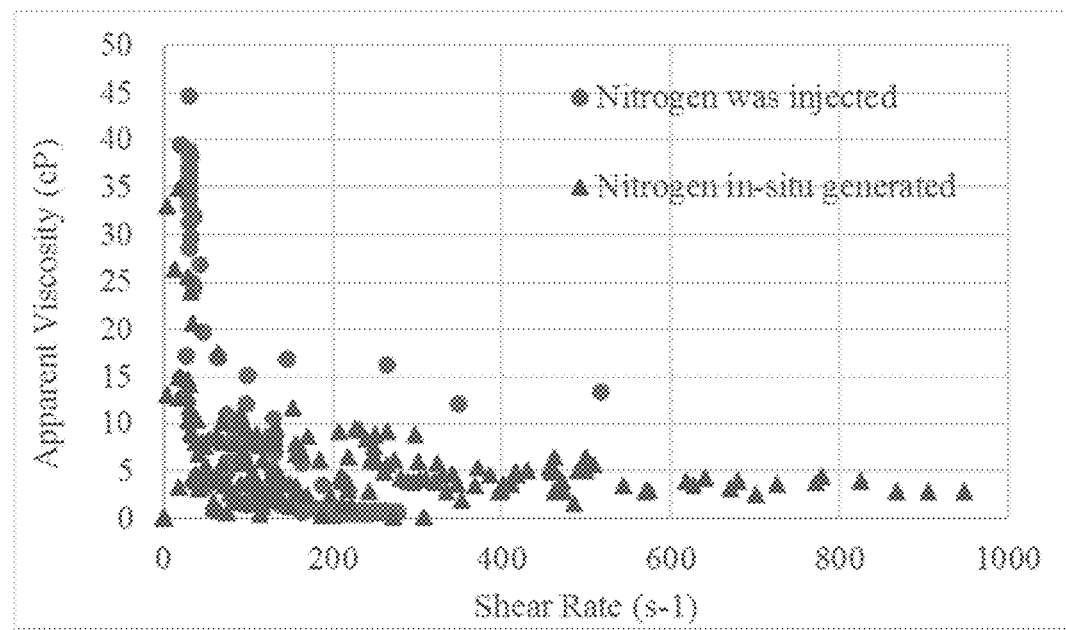
FIG. 4 depicts the apparent viscosity of a nitrogen foam produced with injected nitrogen gas and in situ generated nitrogen gas.

A foam rheometer apparatus was used to ensure that a foam is generated without the injection of $N_2$, and enabling the viscosity of generated foam to be measured. This enables the strength of foam to be compared both with and without the injection of the nitrogen gas. The results of the foam viscosity, as shown FIG. 4, demonstrate that the foam generated using in situ generated nitrogen provides a similarly viscous foam to injected nitrogen. Therefore, gas injection is not needed for foam generation.

The processes of one or more embodiments of the present disclosure enable the generation of a stable, viscous foam in a formation, without the need for gas injection. This enables gas mobility to be lowered and the volumetric sweep efficiency to be improved. The foam of one or more embodiments provides an increased pressure drop across the higher-permeability intervals, consequently diverting the supercritical $CO_2$ and aqueous solution to lower-permeability intervals. Therefore, these processes may enhance oil recovery.

Although the preceding description has been described herein with reference to particular means, materials and embodiments, it is not intended to be limited to the particulars disclosed herein; rather, it extends to all functionally equivalent structures, methods and uses, such as are within the scope of the appended claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A method for treating a hydrocarbon-containing formation, comprising:
   pre-flushing the hydrocarbon-containing formation with a flushing solution comprising a foaming agent to form a pre-flushed hydrocarbon-containing formation;
   injecting an aqueous solution that contains an alkali nitrite, an ammonium halide, and the foaming agent into the pre-flushed hydrocarbon-containing formation; and
   injecting a supercritical carbon dioxide into the pre-flushed hydrocarbon-containing formation;
   where a portion of the supercritical carbon dioxide dissolves into the aqueous solution causing the alkali nitrite and the ammonium halide to react and generate a nitrogen gas; and
   where a foam forms by the interaction of the nitrogen gas with the foaming agent.

2. The method of claim 1, wherein the aqueous solution and the supercritical carbon dioxide are co-injected.

3. The method of claim 1, further comprising displacing hydrocarbons from the pre-flushed hydrocarbon-containing formation by forcing the portion of the supercritical carbon dioxide and the aqueous solution through the pre-flushed hydrocarbon-containing formation.

4. The method of claim 3, further comprising recovering the hydrocarbons that are displaced.

5. The method of claim 3, wherein the pre-flushed hydrocarbon-containing formation comprises a zone of high permeability and a zone of low permeability.

6. The method of claim 5, wherein the at least a portion of the supercritical carbon dioxide and the aqueous solution are forced through the zone of low permeability.

7. The method of claim 1, wherein the aqueous solution comprises a mixture of a first aqueous solution and a second aqueous solution.

8. The method of claim 7, wherein the first aqueous solution contains the ammonium halide in a concentration of the range of 0.5 to 13 M.

9. The method of claim 7, wherein the second aqueous solution contains the alkali nitrite in a concentration of the range of 1 to 15 M.

10. The method of claim 7, wherein one or more of the first aqueous solution and the second aqueous solutions contains the foaming agent.

11. The method of claim 1, wherein a molar ratio of the ammonium halide to the alkali nitrite that are injected into the formation is of the range of 1:1 to 1:3.

12. The method of claim 2, wherein the supercritical carbon dioxide has a quality in the range of 10 to 90%.

13. The method of claim 1, wherein the reaction between the alkali nitrite and the ammonium halide is triggered by a pH of the aqueous solutions decreasing to 5 or less.

14. The method of claim 13, wherein the pH decrease is caused by the portion of the supercritical carbon dioxide dissolving into the aqueous solution.

15. The method of claim 1, wherein the reaction between the alkali nitrite and the ammonium halide is triggered by a temperature of the aqueous solutions increasing to 60° C. or more.

16. The method of claim 15, wherein the temperature increase is caused by the portion of the supercritical carbon dioxide dissolving into the aqueous solution.

17. The method of claim 1, wherein the foam has an apparent viscosity in a range of about 1 to 50 cP.

18. The method of claim 1, wherein the foam has a quality in a range of about 50 to 99%.

19. A method for enhanced oil recovery, comprising:
pre-flushing the hydrocarbon-containing formation with a flushing solution comprising the foaming agent to form a pre-flushed hydrocarbon-containing formation;
injecting a solution comprising an alkali nitrite, an ammonium halide, and the foaming agent into a high permeability zone of the pre-flushed hydrocarbon-containing formation;
decreasing a pH of the solution by injecting a supercritical carbon dioxide into the high permeability zone of the pre-flushed hydrocarbon-containing formation such that the alkali nitrite and the ammonium halide react to generate a nitrogen gas that forms a foam with the foaming agent in the high permeability zone and such that wormholes form in a low permeability zone of the pre-flushed hydrocarbon-containing formation such that hydrocarbons in the low permeability zone of the pre-flushed hydrocarbon-bearing formation are stimulated; and
producing hydrocarbons from the pre-flushed hydrocarbon-containing formation.

20. The method of claim 19, wherein the solution comprises a mixture of a first aqueous solution and a second aqueous solution.

21. The method of claim 20, wherein the first aqueous solution contains the ammonium halide in a concentration of a range of 0.5 to 13 M.

22. The method of claim 20, wherein the second aqueous solution contains the alkali nitrite in a concentration of a range of 1 to 15 M.

23. The method of claim 20, wherein one or more of the first aqueous solution and the second aqueous solutions contains the foaming agent.

24. A method for treating a hydrocarbon-containing formation, comprising:
pre-flushing the hydrocarbon-containing formation with a flushing solution comprising the foaming agent to form a pre-flushed hydrocarbon-containing formation;
injecting an aqueous solution that contains an alkali nitrite, an ammonium halide, and the foaming agent into the pre-flushed hydrocarbon-containing formation, wherein the aqueous solution comprises a mixture of a first aqueous solution containing the ammonium halide in a concentration of a range of 0.5 to 13 M and a second aqueous solution containing the alkali nitrite in a concentration of a range of 1 to 15 M, and a molar ratio of the ammonium halide to the alkali nitrite of a range of 1:1 to 1:3;
injecting a supercritical carbon dioxide into the pre-flushed hydrocarbon-containing formation such that a portion of the supercritical carbon dioxide dissolves in the aqueous solution and causes the alkali nitrite and the ammonium halide to react and generate a nitrogen gas,
wherein the reaction between the alkali nitrite and the ammonium halide is triggered by a pH of the aqueous solutions decreasing to 5 or less; and such that a foam having a viscosity in a range of about 1 to 50 cP to forms by an interaction of the nitrogen gas with the foaming agent.

25. The method of claim 24, wherein one or more of the first aqueous solution and the second aqueous solutions contains the foaming agent.

26. The method of claim 24, wherein a pH decrease is caused by the portion of the supercritical carbon dioxide dissolving into the aqueous solution.

27. The method of claim 24, wherein the foam has a quality in a range of about 50 to 99%.

* * * * *